July 22, 1958  J. CHAVES  2,843,903
FASTENING DEVICE TO RECEIVE A FACING BUTTON
Filed July 2, 1953
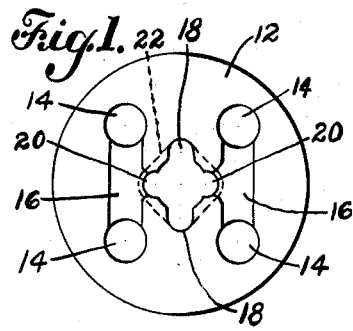
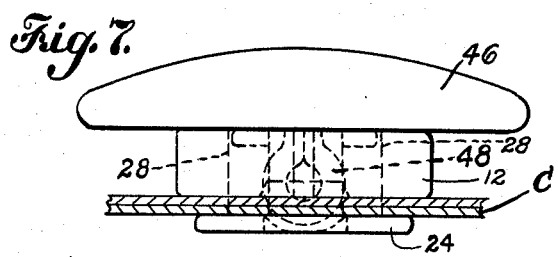
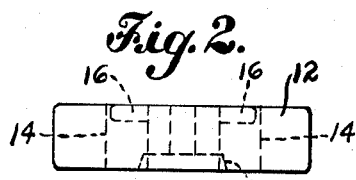
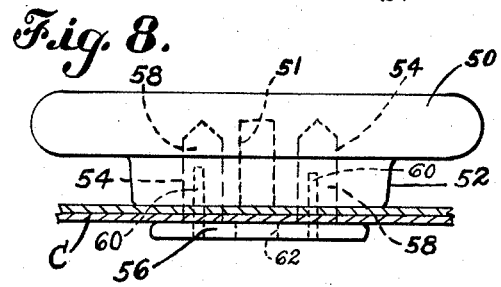
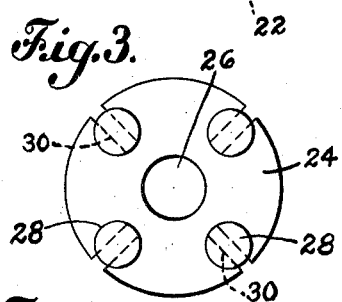
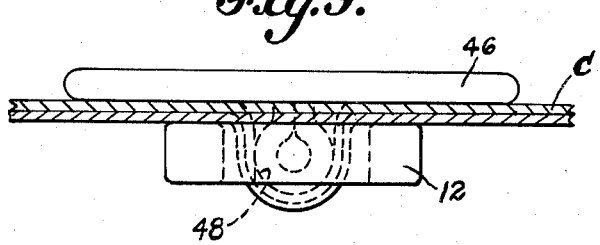
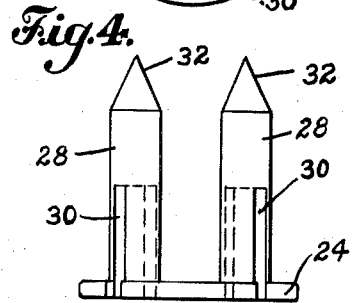
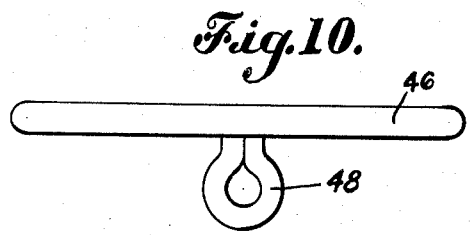
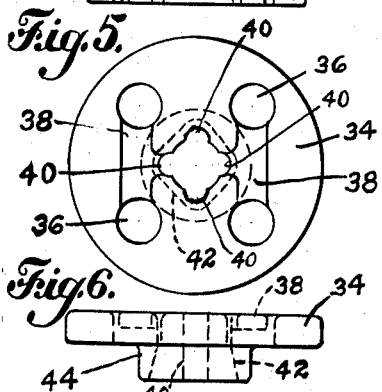
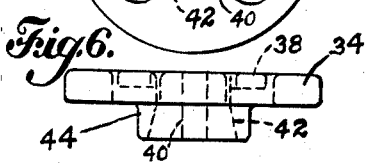
INVENTOR.
John Chaves
BY Harold E. Cole
Attorney United States Patent Office 2,843,903
Patented July 22, 1958

2,843,903

FASTENING DEVICE TO RECEIVE A FACING BUTTON

John Chaves, Taunton, Mass.

Application July 2, 1953, Serial No. 365,662

3 Claims. (Cl. 24—107)

This invention relates to fastening devices to receive a facing button or the like.

One object of my invention is to provide a retainer member of simple construction that is adapted to receive and securely hold a facing button or other article, and which latter can readily be freed from the retainer member.

Another object is to provide a fastening device which can be securely attached to a garment or the like, other than by sewing, and which can also detachably receive a facing button or similar article.

A further object is to provide such a device that is relatively inexpensive to manufacture, is attractive in appearance, and is suitable for use with clothing or as an ornament.

The foregoing and other objects which will appear as the nature of the invention is better understood, may be accomplished by a construction, combination and arrangement of parts such as is disclosed by the drawings. The nature of the invention is such as to render it susceptible to various changes and modifications, and therefore, I am not to be limited to the construction disclosed by the drawings nor to the particular parts described in the specification; but am entitled to all such changes therefrom as fall within the scope of my claims.

In the drawings:

Figure 1 is a top plan view of my retainer member.

Figure 2 is a side elevational view thereof.

Figure 3 is a bottom plan view of my male attaching member.

Figure 4 is a side elevational view of said attaching member.

Figure 5 is a top plan view of a modified form of retainer member.

Figure 6 is a side elevational view of said modified form of retainer member.

Figure 7 is a side elevational view of an assembly of a retainer member, male attaching member, and another male member having a facing button, attached to a piece of cloth.

Figure 8 is a side elevational view of an assembly of a modified form of retainer member having a facing button and attached to a male attaching member.

Figure 9 is a side elevational view of an assembly of a male attaching member having a facing button, and connected to a retainer member, holding a piece of cloth between them.

Figure 10 is a side elevational view of a male member with an attaching eye member.

As illustrated, a retainer or receiver member 12, shown in said Figures 1 and 2, has a plurality of fastening holes 14 therein, and between said holes 14 are recessed portions 16 which are convenient if said retainer member 12 is attached to a garment or other article by thread passing through said holes 14. In the center of said retainer member 12 is a socket that consists of a pair of slots 18, referred to as long-axis slots, and another pair of slots 20 referred to as short-axis slots, both of which pairs of slots have a common central hole. For a portion only of the thickness of said retainer member 12, said socket has a flaring portion 22 at one side, (called the inner side), which extends around it except at the outer extremities of said long-axis slots 18.

A male attaching member, shown in said Figures 3 and 4, has a base 24 preferably having a hole 26 therein at the center, and extending from said base 24 are attaching studs 28, four of them being shown. A slot 30 in each said stud extends in a cross-sectional direction through it and said base, each said slot extending a substantial distance longitudinally commencing at the outer surface of said base 24 and extending into said stud, for instance, about half the length of the latter, as shown. These studs 28 preferably are tapered or pointed, as at 32, at their free ends to make it easier to insert them in said retainer member holes 14, since the body of a stud is of slightly greater diameter or thickness than that of a said hole 14. The material forming the retainer member 12, and male member, is compressible hence the stud 28 can be forced into said hole 14 since said slot 30 permits distortion of the material in the solid portion of the stud beyond it. This male member may be made of nylon in solid form, a hard rubber composition, or other material that is compressible, yet firm enough to remain locked in a said hole 14 after being forcibly pushed into it. Said tapered end 32 may be broken or cut off insofar as it extends beyond said retainer member 12.

In Figures 5 and 6 of the drawings is shown a modified retainer or receiver member 34 which has fastening holes 36 therein connected by recessed portions 38. It is shown with a reduced neck portion 44. A socket at the center includes two pairs of slots 40 which are of equal length, having a common center, and said socket has a flaring portion 42 at one side (called the inner side) which extends all the way around (including the neck) to provide room for movement of a male attaching member, later described.

In Figure 10 of the drawings I show a male attaching member that is shown in the assemblies shown in Figures 7 and 9. It has a facing button 46 and an attaching eye member 48 fastened to the said facing button 46. Said eye member 48, at its maximum width, is slightly wider than either said short-axis slots 20 and 40; but slightly less in width than said long-axis slot 18, hence it will remain connected to either said retainer members 12 or 34, once it is forced into either of their sockets by distorting them at said pairs or axes 20 or 40, except said eye member 48 will pass out of said long-axis slot 18 when correctly postioned to de so. Ordinarily this eye member 48 will extend across said short-axis slot 20, except when removal is desired, whereupon it is rotated until it extends across said long-axis slot 18, from which position it can readily be removed from the socket. Said flaring portions 22 and 42 permit some movement of said eye member 48, after it enters a said socket, hence the latter can forcibly be drawn out of either said slot 40 by distorting the latter somewhat.

In Figure 8 of the drawings a modified form of facing button 50 is shown with a reduced or neck portion 52 and a hole 51 extending through the center of the latter and into said facing button 50. There are a plurality of holes 54, four being shown, extending from said neck portion 52 part way into the main body of said button 50. A male attaching member has a base 56 and studs 58 extending therefrom which are sufficiently long to enter and substantially fill said holes 54, being slightly greater in diameter or width than said holes 54, hence they have to be compressed by forcibly pressing them thereinto. Each stud 58 has a slot 60 extending across it for part of its length to make said compression of the solid portion beyond it possible. There is also a central hole 62 in said base 56.

When it is desired to use said male attaching member shown in Figure 10 it is inserted into a socket of either said retainer member shown, with the cloth C between said eye member 48 and a said retainer member. The cloth C can pass outside of said eye member 48, as shown in said Figure 9, or a hole cut in the latter and said eye member inserted through the hole.

As shown in said Figure 8, said studs 58 extend through said cloth C and hold it between said base 56 and the retainer member, making an assembly that is permanent.

In said Figure 7 the cloth C is held between said base 24 and said retainer member 12, or retainer member 34 if the latter is used, the studs extending through the cloth to thereby provide a permanent attachment. In order to provide a removable facing button in this assembly, a male attaching member such as the one shown in said Figure 10 is used, with said eye member 48 being inserted into the socket, where it may be removed at will by drawing it out of said long-axis slots 18, or forcibly drawing it out of a pair of slots 40 if the retainer member 34 is used.

What I claim is:

1. A fastening device comprising a retainer member having a socket and a plurality of holes therein, an attaching member embodying a plurality of stud members of compressible material and being of such size relative to said holes that they are adapted to enter therein only when compressed, and another attaching member embodying a facing button, and an eye member attached to said facing button and of such size that it is adapted to enter said socket and be retained therein.

2. A fastening device comprising a retainer member having a socket and a plurality of holes therein, said socket embodying two pairs of slots formed therein one pair of which is longer than the other, an attaching member embodying a plurality of stud members of compressible material said attaching member being of such size relative to said holes that they are adapted to enter therein only when compressed, and another attaching member embodying a facing button, and an eye member of such size that it is adapted to enter said longer pair of slots and of too great width to enter said other pair of slots except under pressure.

3. A fastening device comprising a retainer member having a socket and a plurality of holes therein, said socket having a central hole therein and having two pairs of slots in communication with said central hole one pair of which is longer than the other, an attaching member embodying a plurality of stud members of compressible material extending into said plurality of holes and being of such size relative to said holes that they are compressed therein, and another attaching member including an eye member of such size that it is adapted to enter said longer pair of slots and of too great width to normally enter said other pair of slots.

References Cited in the file of this patent

UNITED STATES PATENTS

| | | |
|---|---|---|
| 322,542 | Kearns | July 21, 1885 |
| 467,663 | Keplinger | Jan. 26, 1892 |
| 487,344 | Capewell | Dec. 6, 1892 |
| 652,122 | Krudemann | June 19, 1900 |
| 691,743 | Capewell | Jan. 28, 1902 |
| 829,837 | Brisacher | Aug. 28, 1906 |
| 1,173,817 | Le Breton | Feb. 29, 1916 |
| 1,192,414 | Gaunt | July 25, 1916 |
| 1,570,398 | Purinton | Jan. 19, 1926 |
| 1,808,535 | Erwin | Sept. 26, 1930 |
| 2,270,814 | Scribner | Jan. 20, 1942 |

FOREIGN PATENTS

| | | |
|---|---|---|
| 22,848 | Great Britain | of 1905 |
| 122,159 | Australia | Sept. 2, 1946 |
| 424,163 | Great Britain | Feb. 15, 1935 |
| 767,818 | France | May 7, 1934 |
| 860,259 | France | Sept. 24, 1940 |
| 979,588 | France | Dec. 13, 1950 |